United States Patent [19]

Ruther et al.

[11] 3,750,851

[45] Aug. 7, 1973

[54] POWER MECHANISM

[75] Inventors: Clarence E. Ruther, Norwalk;
Patrick D. Sullivan, 8321 Oakmont, Buena Park, both of Calif.

[73] Assignee: said Sullivan, by said Ruther

[22] Filed: Dec. 20, 1971

[21] Appl. No.: 209,816

[52] U.S. Cl................. 188/26, 188/70 R, 188/72.8
[51] Int. Cl............................................... B62l 5/02
[58] Field of Search...................... 188/2 D, 24, 26, 188/70 R, 72.7, 72.8; 192/6 R

[56] References Cited
UNITED STATES PATENTS

| 1,020,798 | 3/1912 | Carlson | 188/26 |
| 1,613,541 | 1/1927 | Smith | 188/72.7 |
| 2,552,484 | 5/1951 | Hood | 188/26 |

*Primary Examiner*—Duane A. Reger
*Attorney*—Harvey C. Nienow, Grover A. Frater et al.

[57] ABSTRACT

The present invention is directed to a power mechanism that may be used for either absorbing or transmitting power; the invention being explained in terms of a motorcycle brake. It discloses a wheel structure in which the wheel-hub acts as a brake-drum, and a pair of separatable conical members is positioned internally of the hub, and acts as a continuous peripheral brake-lining.

8 Claims, 5 Drawing Figures

PATENTED AUG 7 1973 3,750,851
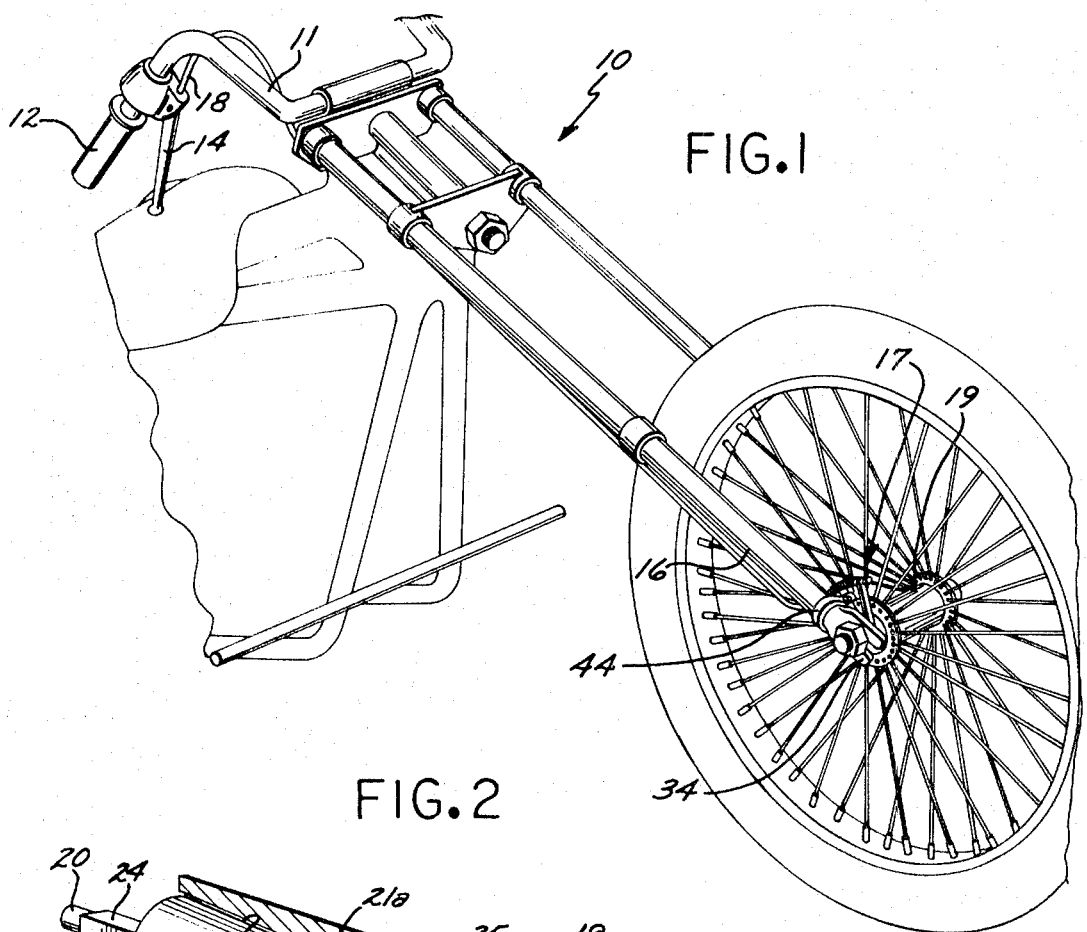
FIG.1
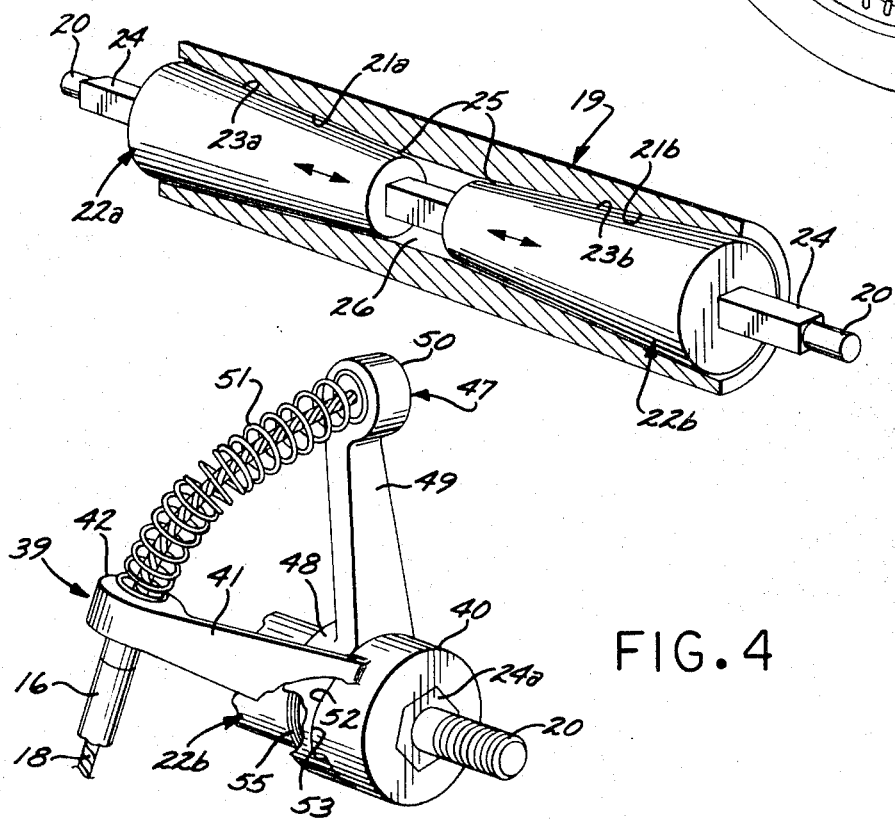
FIG.2
FIG.4

POWER MECHANISM

BACKGROUND

There is an ever-increasing need for a mechanism that can absorb or transmit power, examples of these two functions being brakes and clutches, respectively. The present invention is adapted to perform either of these functions, but, for simplicity of explanation, will be presented in terms of a power-absorbing brake. However, this is not to be construed as a limitation of the invention; and a discussion of the invention's power-transmission characteristics will be given later.

At present, the use of motorcycles is growing by leaps and bounds, by both conservative riders such as the police and the like, and by the "choppers" who delight in modifying their machines. In both cases, it is acknowledged that better brakes are a necessity — due to the ever higher speeds, and to the greater traffic congestion to which the motorcyclists are subjected.

Many brake improvements have been suggested, and implemented; but brakes are still not completely satisfactory. It has been found most convenient to operate the front brake of a motorcycle by means of a hand-lever positioned adjacent to the handlebar grip — a squeezing action by the motorcyclist moving this hand-lever, and causing a brake-cable to move longitudinally within a protective sheath. The free end of the brake-cable generally pulls on a pivotable brake-arm that is fastened to a brake-assembly. Here, the pivoting motion of the brake-arm causes a brake-shoe to be pressed against a brake-drum, thus absorbing power and bringing the motorcycle to a stop.

On some brake assemblies, there is a secondary brake-arm that is mechanically interlinked with the first brake-arm; so that a dual action is thus obtained for actuating two brake-shoes, or for actuating the two ends of a single brake-shoe.

Unfortunately, the type of off-center pull produced by the brake-cable, the type of torque produced by the brake-arms, the type of motion produced by the brake shoes, etc. all coact in such a way as to produce unbalanced forces and torques that require ever-stronger brake assemblies; and these, in turn, require heavier support structures and/or more expensive material — both of which are objectionable.

One recent brake improvement has been the introduction of so-called "disc brakes", these incorporating a hand-operated fluid-pump that is actuated by the above-described hand-lever — the resultant pressurized fluid operating the disc brake. For a number of reasons, the motorcycle disc brake has not been well received.

It may thus be seen that there is a need for an improved brake structure that is economical, easy to build, minimizes excessive torque, and provides a balanced-force operation.

OBJECTS AND DRAWINGS

It is therefore the principal object of the present invention to provide an improved power mechanism for transmitting and/or absorbing power.

It is another object of the present invention to provide an improved clutch mechanism.

It is still another object of the present invention to provide an improved brake mechanism.

It is a further object of the present invention to provide an improved brake mechanism for a motorcycle.

It is a still further object of the present invention to provide an improved motorcycle brake mechanism that may be retro-fitted onto existent motorcycles.

The attainment of these objects and others will be realized from a study of the following description, taken in conjunction with the drawings of which FIG. 1 shows a portion of a motorcycle using the disclosed invention;

FIG. 2 shows a schematic representation of the principle of the disclosed invention;

FIG. 4 shows the actuators and their cooperative relationship; and

SYNOPSIS

Figure 5:
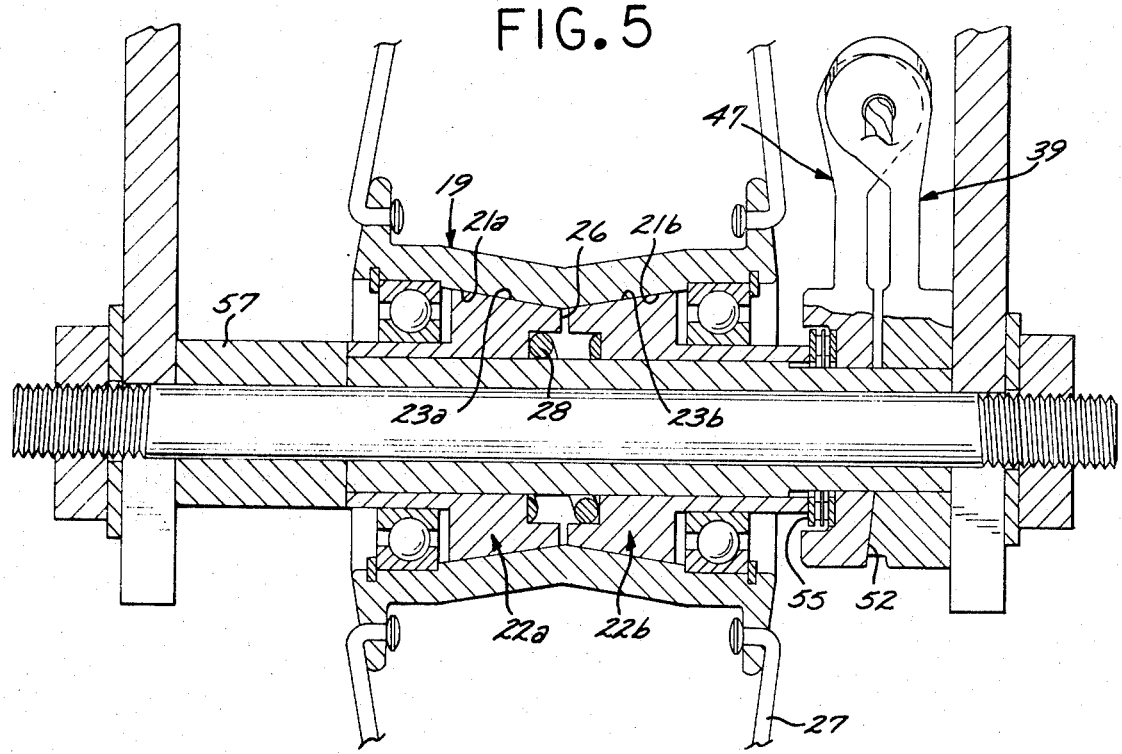
FIG. 5 shows a transverse cross-sectional view of a brake mechanism using the disclosed mechanism, the brake assembly being shown in its activated state.

Broadly speaking, the present invention discloses a power-mechanism using a rotatable cylindrical member whose inner peripheral surface is angled in the manner of a double-cone configuration. A pair of conical members are positioned co-axially within the cylindrical member, so that the outer peripheral surfaces of the conical members face their corresponding inner peripheral surfaces of the cylindrical member.

Normally, the conical members are urged apart, so that there is no contact between the facing peripheral surfaces; and either member is free to move or rotate relative to the other. When the mechanism is activated, the two conical members are moved toward each other, so that frictional contact is made between the peripheral surfaces of the conical members and the peripheral surfaces of the cylindrical member.

This frictional engagement may be used to provide a braking action, a clutching action, or the like.

DESCRIPTION

The Motorcycle

FIG. 1 shows a portion of a motorcycle using the present invention as a front-wheel brake, motorcycle 10 having a handlebar 11 and a pair of hand grips 12. A brake-housing 13 is fixably positioned adjacent one of the hand-grips 12, the brake-housing 13 having a pivotable hand-lever 14 associated therewith. A protective-sheath 16 has one end thereof affixed to brake-housing 13, and extends to a brake-assembly 17 that is associated with the front wheel of the motorcycle. A brake-cable 18 (not visible in FIG. 1) is affixed to the hand-lever 14; and traverses the inside of the protective-sheath 16 to the brake-assembly 17.

When the hand-lever 14 is pivoted, as by squeezing it toward the hand-grip 12, the brake-cable is moved longitudinally; and its free-end also moves longitudinally, to activate the brake-assembly 17 — in a manner to be discussed more fully later.

Basic Inventive Concept

The basic inventive concept will be understood from the pictorial cutaway schematic representation of FIG. 2. Here, a hollow cylinder 19 is adapted to rotate around an axis indicated at axle 20, the angled inner peripheral-surfaces 21a and 21b of cylinder 19 being shown as a double-coned configuration.

Within cylinder 19 are positioned two separate matching cones 22a and 22b, these being positioned coaxially with cylinder 19, cones 22a and 22b having angled outer peripheral-surfaces 23a and 23b that face and correspond to the angled peripheral-surfaces 21a and 21b of cylinder 19.

Cones 22a and 22b are mounted on a "slide" shaft 24 that is illustrated as having a square outer periphery. Thus, cones 22a and 22b may slide along slide-shaft 24; but when the slide-shaft 24 is locked against rotation, the cones 22a and 22b are also prevented from rotating.

As indicated in FIG. 2, there is a peripheral spacing 25 between the outer peripheral-surface 23a and 23b of cones 22a and 22b and the inner peripheral-surfaces 21a and 21b of cylinder 19; and, due to the presence of peripheral space 25, cylinder 19 may rotate freely relative to the cones 22.

However, as soon as the cones 22a and 22b are moved longitudinally toward each other, as permitted by space 26, their outer peripheral-surfaces 23a and 23b make contact with the inner peripheral-surfaces 21a and 21b of the revolving cylinder 19, the resulting surface-to-surface contact between the rotating cylinder 19 and a non-rotating cone 22 providing a braking action that absorbs power from the rotating cylinder 19, thus bringing it to a stop.

In this way, the principles of FIG. 2 may be used as a brake for stopping the rotation of cylinder 19; the act of permitting the cones 22 to move away from each other releasing the brake, and restoring the free rotation of the cylinder 19.

It will be shown later that it is preferable, from a practicability consideration, for one of the cones 22 to be "anchored" against longitudinal movement; whereas the other cone 22 is actuated to move longitudinally toward and away from the first anchored cone. In either case, the net effect — the moving together or apart of the two cones — is thus accomplished; and will be discussed more fully later.

An Operative Embodiment, Passive State

Figure 3:
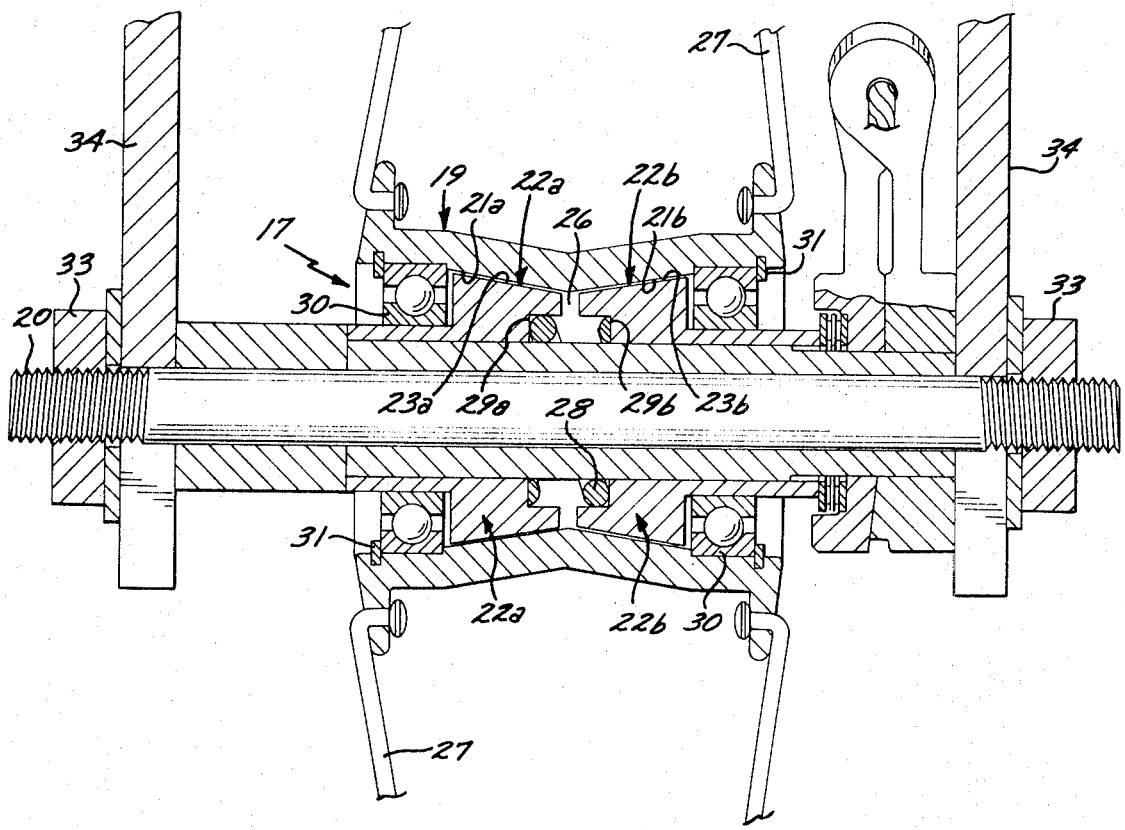
FIG. 3 shows a transverse cross-sectional view of a brake assembly using the disclosed mechanism, the brake assembly being shown in its normal passive state.

Attention is now directed to FIG. 3, which shows a cross-sectional view of a brake-assembly 17 in a normal passive state. Here, the previously discussed rotatable cylinder takes the form of a wheel-hub 19; wheel-spokes 27 being attached between the wheel-hub 19 and the wheel-rim, as indicated in FIG. 1.

The previously discussed cones are again shown at 22a and 22b. Since the representation of FIG. 3 for the passive state, wherein the motorcycle is rolling along the road, there are peripheral spacings between the inner peripheral-surfaces 21a and 21b of the wheel-hub 19 and the outer peripheral-surfaces 23a and 23b of the cones 22. The separated, or retracted, positions of the cones 22a and 22b — as indicated by spacing 26 — is achieved by means of a helical cone-spring 28 that is fitted into suitable cone-recesses 29a and 29b, the two end-coils preferably being flattened off for better contact with the end of the recesses. Thus, the cone-spring 29 biases apart the cones 22a and 22b into their passive positions. The passive positions of the cones of course retain the peripheral spacing 25 between the outer peripheries of the cone 22 and the inner periphery of the wheel-hub 19.

As indicated in FIG. 3, wheel-bearings 30 of any suitable type are positioned in such a manner as to permit easy rotation of the wheel-hub 19. In the illustration, wheel-bearings 30 are indicated to fit between the wheel-hub 19 and the cones 22, being held to the wheel-hub 19 by means such as retaining-rings 31. Of course, other types of bearing mountings may be used.

Suitable fastening means, such as nuts 33, are used to assemble the axle 20, the frame 34 and the brake-assembly 17 into a unitary structure.

Thus, the passive state of the brake-mechanism, as illustrated in FIG. 3, permits the hub 19 — and the wheel mounted thereon — to rotate freely on the hub-bearings 30 for normal riding conditions.

Actuation Mechanism

The disclosed mechanism may be readily actuated by the apparatus shown in FIG. 4.

As indicated above, the brake is to be activated by pressure on the brake-handle 14 (shown in FIG. 1), which in turn produces longitudinal movement of a brake-cable enclosed within the protective sheath 16.

In FIG. 4, which shows an actuating mechanism for the brake-assembly, the end of the protective sheath 16 is indicated to be affixed to an actuator 39 that comprises a disk-like core 40, an arm 41, and an outer flared portion 42. As indicated in FIG. 1, arm 41 is affixed to a portion of the motorcycle-frame 34, as by means of a suitable strapping arrangement 44, thus "immobilizing" or "anchoring" the actuator 39.

FIG. 4 also shows a slide-shaft 24a, indicated to have a circular axial-bore for receiving a round cross-sectional axle 20, and indicated to have a hexagonally-shaped periphery that is mated to a hexagonal opening in the core 40 of the anchored-actuator 39. Thus, since the actuator 39 is anchored (to the frame) against rotation, the hexagonal slide-shaft 24a — which is mated to the anchored-actuator 39 — is also rotationally immobilized; the axle 20 providing suitable structural support.

A second actuator 37 also comprises a disk-like core 48, an arm 49, and a flared portion 50; actuator 47 having, in its core, a round opening that fits around the hexagonal periphery of the slide-shaft 24a. Thus, actuator 47 may rotate in a pivotal manner around slide-shaft 24a, to activate the mechanism.

As shown in FIG. 4, the pivotal rotation of active actuator 47 is achieved by means of the afore-mentioned brake-cable 18, cable 18 being illustrated as having its free-end threaded through an opening in the flared portion 42 of the anchored actuator 39, and being then "locked" into the flared end 50 of the active actuator 47. The end portion of the brake-cable 18 may be used to support and position a helical actuator-spring 51 that normally separates the two actuators 39 and 47.

The free end of the brake-cable 18 may be locked to the active actuator in a number of ways, one of the most satisfactory being to have the free end of the brake-cable 18 comprise a "locking block" that fits into a suitable recess in the flared portion 50 of the active actuator 47. This locking block may be formed by "upsetting" a length of the brake-cable 18, and forming this upset-material into a locking block. Alternatively, the free end of the brake-cable 18 may be buried in a locking block by having the locking block material molded around the free end of the brake-cable 18.

Actuation

In any case, when the hand lever 14 is squeezed, it moves the free end of the brake-cable 18; and the movement of the free end of the brake-cable, as shown in FIG. 4, produces pivotal of the active actuator 47.

The pivotal rotation of the active actuator 47 relative to the anchored actuator 39 has the following effect. As indicated in FIG. 4, one of the actuators (the anchored actuator 47 in the illustration) has its core-portion 40 formed into one or more protuberances 52 that take the form of wedge-like ramps, three such circumferentially-spaced ramps 52 having been found to be satisfactory.

The other actuator (the active actuator 47 in the illustration) has a like plurality of complementarily-spaced and shaped ramps — which may take the form of recessed grooves 53 that are adapted to receive the above-described protruding ramps 52.

It will thus be realized that — depending upon the instantaneous angular relation between the two actuators 39 and 47 — the ramps 52 may be completely received into respective grooves 53, may be partially received by respective grooves, or may be completely external of the respective grooves. Thus, as the active actuator 47 is pivoted relative to the anchored actuator 39, the emergence of the ramps from their grooves causes the two actuators to be moved apart, i.e. axially displaced — the anchored actuator 39 and its associated slide-shaft 24a remaining rotationally immobilized, so that the active actuator 47 is moved leftwise in the above illustration.

The resultant leftward movement of the active actuator 47 causes it to slide sidewise along the slide-shaft 24a, thus causing its distal face to apply a leftward pressure onto a thrust-bearing 55; this, in turn, applying a leftward pressure onto the end-portion of cone 22b.

Operative Embodiment, Activated State

Attention is now directed to FIG. 5, which shows a cross-sectional view of the disclosed mechanism in the brake's activated-state. FIG. 5 shows the two actuators 39 and 47 to be in a spaced apart "activated" position produced by the pivotal rotation of the active actuator 47 — this pivotal rotation having brought the ramps 52 out of their respective grooves, and having provided a leftward movement to the active actuator 47.

It will be recalled that the hexagonal slide-shaft 24a is rotationally immobilized by its mating relation with the strapped-down anchored-actuator 39; and that the cones 22a and 22b are slidably mounted on the hexagonal periphery of slide-shaft 24a. Thus, the leftward movement of the active actuator 47 produces a leftward movement of the thrust-bearing 55, and of the non-rotatable active-cone 22b.

The leftward movement of the active-cone 22b compresses cone-spring 28; so that the resultant spring pressure moves the inactive-cone 22a leftward until it abuts a stop 57.

As a result of the leftward movement of the active actuator 47, the two non-rotating cones 22a and 22b thus approach each other; and as they do so, their angled outer peripheral-surfaces 23a and 23b come into contact with the inner peripheral-surfaces 21a and 21b of the rotating hub 19.

The continued activation of the brake causes the cones to move progressively closer to each other, the outer peripheries 23a and 23b of the cones moving into ever-tighter frictional engagement with the inner periphery 21 of the rotating hub. This frictional engagement provides the desired braking action between the rotating hub 19 and the non-rotating cones 22.

De-actuation

When the brake is to be released, hand-lever 14 is released; and the brake-cable 18 then permits the actuators to resume their normal passive separated position, under the influence of the actuator-spring 51, as indicated in FIG. 4. This passive position allows the ramps to re-enter their respective grooves; and permit the active actuator 39 to resume its rightmost position indicated in FIG. 3.

The rightward movement of the active actuator 39 permits the cones 22a and 22b to separate by permitting the active-cone 22b to also move to the right under the influence of the previously-compressed cone-spring 28, which now urges the two cones apart to their passive state. In this way, the brake is released.

Clutch

It was pointed out above that the disclosed mechanism may be used for power-absorption in the manner of a brake, or for power-transmission in the manner of a clutch. In order to clarify the clutch action, attention is directed back to FIG. 2. It will be recalled that previously the assumption was made that the cylinder 19 was rotating about its axis; and that the cones 22 were to bring the rotation to a stop.

For a clutch operation, however, assume that the cylinder 19 is to continue its rotation; but that the rotation is to be transmitted to the slide-shaft 24, or to the axle 20. In this case, as the peripheries of the cones and the cylinder become engaged, the rotation of the cylinder is transmitted through the cones to the shaft — the assembly thus acting like a clutch.

If desired, the shaft — or the cone — may be the rotating member; and the rotation may be transmitted to the cylinder. Alternatively, one of the cones may be the rotating member; and the rotation may be transmitted to the cylinder, to the shaft, or to the other cone. Thus, a mechanism similar to the one described may be used for power absorption and/or for power transmission.

SUMMARY

The disclosed invention has many advantages over prior art power mechanisms. First of all, it automatically provides a full 360° peripheral contact at all times. Second, the forces are generally balanced. Third, non-centered torques are reduced to a minimum. Fourth, the principal forces are directed along the axle, and are easily withstood. Fifth, the actuation is extremely simple. Sixth, the overall mechanism is easily manufactured. And finally, the disclosed brake arrangement is readily retro-fitted onto existent motorcycles.

We claim:

1. A power mechanism comprising:
   a cylindrical member adapted to rotate around a given axis;
   said cylindrical member having two differently-angled peripheral-surfaces;
   a first conical member mounted co-axially with respect to said cylindrical member;
   a second conical member mounted co-axially with respect to said cylindrical member;
   each of said conical members having angled peripheral-surfaces that are angled to correspond to one of said angled surfaces of said cylindrical member;
   slide-shaft means for mounting said conical members co-axially with said cylindrical member, for permitting said conical members to slide axially relative to each other;
   means for urging said conical members apart into a passive state;

actuator means for urging said conical members toward each other into an activated state, for causing said angled peripheral-surfaces of said conical members to contact respective angled peripheral-surfaces of said cylindrical member;

said actuator means comprising a first pivoted actuator adapted to move at least one of said conical members toward said other conical member;

said actuator means comprising a second actuator;

displacement means for axially displacing said first actuator relative to said second actuator;

said displacement means comprising a plurality of ramps in one of said actuators, and a like plurality of complementarily-shaped grooves in the other said actuator.

2. The combination of claim 1 including cable means for pivoting said first actuator.

3. A motorcycle brake comprising:

a hub adapted to rotate around an axle;

said hub having two differently-angled inner peripheral-surfaces in a double-cone configuration;

a first conical member mounted co-axially with respect to said hub;

a second conical member mounted co-axially with respect to said hub;

each of said conical members having outer angled peripheral-surfaces that are angled to correspond to one of said angled surfaces of said hub;

slide-shaft means, having a hexagonal periphery, for mounting said conical members co-axially with respect to said hub, for permitting said conical members to slide axially relative to each other;

spring means for urging said conical members apart into a passive state;

actuator means for urging said conical members toward each other into an activated state, for causing said outer angled peripheral-surfaces of said conical members to contact respective inner angled peripheral-surfaces of said hub;

said actuator means comprising a first pivoted active-actuator adapted to move one of said conical members toward said other conical member;

said actuator means comprising a second anchored-actuator that is rotationally-immobilized;

displacement means comprising a plurality of ramps in one of said actuators, and a like plurality of complementarily-shaped grooves in the other said actuator.

4. The combination of claim 3 wherein said anchored-actuator and said slide-shaft are interlocked by said hexagonal periphery for rotationally-immobilizing said slide-shaft and said conical members.

5. The combination of claim 4 wherein said anchored-actuator is strapped to the frame of said motorcycle to achieve rotational immobilization.

6. The combination of claim 5 including cable means, attached to said active actuator, for pivoting said active-actuator.

7. The combination of claim 6 including a thrust-bearing positioned between said moved conical member and said active actuator.

8. The combination of claim 7 including a wheel attached to said hub;

whereby said hub acts as the brake drum for said wheel.

* * * * *